April 18, 1933.  C. VON HOFE ET AL  1,903,886
APPARATUS FOR DETERMINING THE SPEED OF FLIGHT OF AIRCRAFT
Filed July 8, 1930
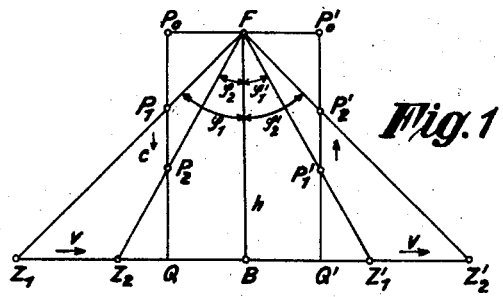
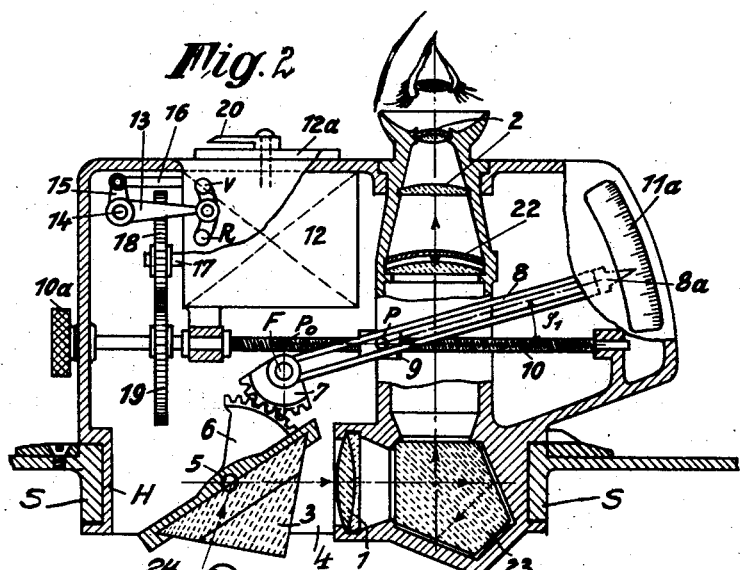
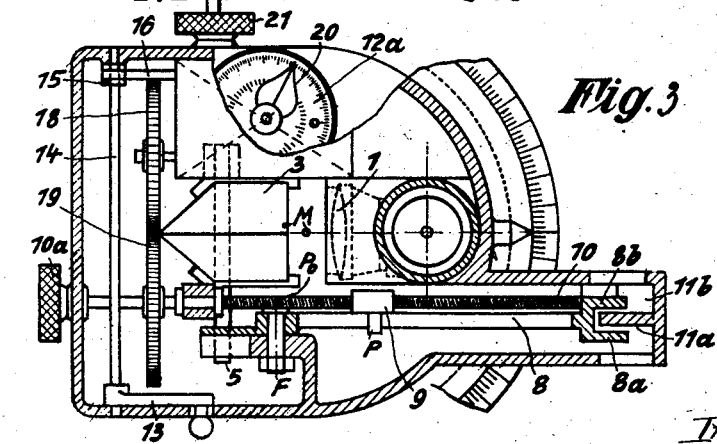
Inventors:—
Christian von Hofe
Johann Boykow
by Langner, Parry, Card & Langner
Attys.

Patented Apr. 18, 1933

1,903,886

UNITED STATES PATENT OFFICE

CHRISTIAN von HOFE, OF VIENNA, AUSTRIA, AND JOHANN BOYKOW, OF BERLIN-LICHTERFELDE, GERMANY, ASSIGNORS TO CZECHOSLOVAK COMPANY: ACTIEN-GESELLSCHAFT C. P. GOERZ OPTISCHE ANSTALT ACTIOVA SPOLECNOST K. P. GOERZ OPTICKY USTAV, OF PRESSBURG, CZECHOSLOVAKIA

APPARATUS FOR DETERMINING THE SPEED OF FLIGHT OF AIRCRAFT

Application filed July 8, 1930, Serial No. 466,496, and in Germany July 13, 1929.

The shell dropping apparatus constructed in accordance with the U. S. Patent No. 1,703,386 is not only adapted for determining the line of sight intersecting the target at that moment at which the shell has to be dropped for hitting the target, but also for determining the speed of flight of the aircraft above the ground, provided however, that there is in the direction of the flight, in front of the observer a readily observable stationary object or point of reference. Otherwise, for instance in case of a flight above the ocean, such a stationary object can be provided only by dropping a floating structure visible at great distances, but the floating structure serving as a point of reference will then naturally appear in rear instead of in front of the observer so that with such a dropping device it is impossible to determine the speed of the air craft.

The object of the present invention is to adapt the apparatus above referred to for determining the speed of the aircraft even if the point of reference is in rear of the observer. This object is arrived at according to the invention by turning the dropping device around a vertical axis through an angle of at least 180° and simultaneously reversing the direction of movement for operating the entering reflector by means of a reversing gearing provided in the clockwork actuating the reflector so that the point of reference lagging behind the reflector comes into coincidence in the field of vision of the observation telescope which is provided with a water level, with the air bubble of the water level for the first time at the beginning and for the second time at the end of a measuring period, thus permitting to determine from the duration of the measuring period and from the given height of the aircraft above the ground the speed of flight of the aircraft.

A constructional form of the invention is illustrated by way of example in the annexed drawing. Fig. 1 represents the theoretical basis of the invention, Fig. 2 is a side elevation partly in section and Fig. 3 is a plan view partly in section of a preferred form of our invention.

It is assumed with reference to Fig. 1 that the aircraft is stationary at the point F in the height $BF=h$ above the ground, while the ground or the surface of the sea with the target moves backwards, that is to say to the right of the aircraft. The angle between the sight line to the target and the vertical is $\varphi_1$ at the beginning and $\varphi_2$ at the end of the measuring period T during which the target moves from $Z_1$ to $Z_2$ if it is in front of the observer. If, however, the target consists of a floating structure dropped from the aircraft and therefore is in rear of the observer, it will be at $Z_1'$ at the beginning and at $Z_2'$ at the end of the measuring period, the corresponding angles being $\varphi_1'$ and $\varphi_2'$ respectively. For determining the angles of inclination of the line of sight at any time existing we arrange at a predetermined distance $F P_0$ from the pivot point F of the sight line a rectilinear guide $P_0Q$ for a pivot point $P_1$ by which the sight line is guided. If from the beginning of the measuring period a uniform movement is imparted by a clockwork to the point $P_1$, the point of intersection of the sight line with the path $Z_1B$ of the target along the path moves at first more quickly and then more slowly than the target so that after a certain time T the target being in the point $Z_2$ falls again in the positively turned sight line $FZ_2$, at which moment the angle of inclination of the sight line and the vertical will be $\varphi_2$. The way through which the target has moved during this measuring period is defined by $$Z_1Z_2=v\,T=h\,(\tan\varphi_1-\tan\varphi_2).$$

Exactly the same result is obtained the target being in rear of the observer which is at $Z'_1$ at the beginning and at $Z_2'$ at the end of the measuring period T, in this case the distance through which the target has moved is
$$Z_1'Z_2' = v\,T = h\,(\tan\varphi_2' - \tan\varphi_1'),$$
it being assumed that $\varphi_2' = \varphi_1$ and $\varphi_1' = \varphi_2$.

From these equations we obtain the speed $v$ of the aircraft as a function of the height $FB = h$ of the air craft above the ground $$v = \frac{h\,(\tan\varphi_1 - \tan\varphi_2)}{T} = \frac{h\,(\tan\varphi_2' - \tan\varphi_1')}{T}$$

wherein the measuring time $$T = \frac{P_1 P_2}{c} = \frac{P_1' P_2'}{c}$$

and $c$ is the uniform speed of the movement of the point $P_1$ or $P_1'$. Hence $$v = \frac{h\,c}{P_1 P_2}(\tan\varphi_1 - \tan\varphi_2) = \frac{h\,c}{P_1' P_2'}(\tan\varphi_2' - \tan\varphi_1').$$

From the above it will be understood that the triangle $FZ_1'Z_2'$ for a target in rear of the observer is obtained by turning the triangle $F\,Z_1\,Z_2$ for a target in front of the observer around a vertical $F\,B$ through an angle of 180° reversing at the same time the movement of the point $P_1'$ as a point of the sight line $FZ_1'$ at the beginning of the measuring period as compared with the direction of movement of the point $P_1'$.

Now it will be understood that for adjusting the sight line angles $\varphi_1\,\varphi_2$ and $\varphi_1'\,\varphi_2'$ direction of movement $P_0Q$, $P_0'Q'$ sight line points $P_1\,P_2$ and $P_1'\,P_2'$ may be selected at will as long as by any suitable means, for instance gear wheels, the angles $FP_1\,P_0$, $FP_2\,P_0$ and $FP_1'\,P_0'$, $FP_2'\,P_0'$ are correctly transmitted to the optical line of sight as is effected in the constructional form of our apparatus shown in Figs. 2 and 3. In Figs. 2 and 3, 1 is the objective and 2 the eye piece of the telescope in the casing of which a rotatable entering reflector 3 is mounted in front of a window 4 on horizontal trunnions 5. Secured to the reflector frame is a toothed segment 6 which meshes with a toothed segment 7 of half the radius of the segment 6. The segment 7 is pivoted on journal pin F and rigidly connected to a link 8 provided with a longitudinal rectilinear slot into which engages the pin P of a nut 9 engaging a screw spindle 10 but locked against rotation. The screw spindle 10 is journalled in the casing of the apparatus. The position of the link 8 is indicated on the scale 11a by the point 8a, which scale also indicates the adjustments of the reflector 3 required for the different heights $h$ of flight and periods of observation. A clockwork 12 imparts a uniform rotary movement to the screw spindle 10 in the one or in the other direction, according to the position of the reversing lever 13, the movement of which is transmitted to the crank 15 by means of a shaft 14 whereby the medium of the push bar 16 the direction of rotation of the clock work shaft 17 is reversed in any well known manner not illustrated. On the shaft 17 is mounted a spur wheel 18 engaging into a spur wheel 19 fast on the screw spindle 10. The uniform rotary movement of the shaft 17 is transmitted in any known or preferred manner to a pointer 20 moving along the scale 12a in the one or in the other direction according to the position of the reversing lever 13. The clockwork 12 may be wound up by a handle 21 while the handle 10a secured to the screw spindle 10 serves for adjusting the pointers 8a and 20. For securing a vertical position of the telescope a transparent focus water level 22 serving as a collective lens is provided in the image plane of the telescope so that the air bubble of the water level appears on the target's image rectified by the prism 23.

In order to enable the instrument above described to rotate around a vertical axis M, its casing is provided at its lower part with a tubular extension H freely rotatable by hand in a stationary bearing S.

For determining the speed of flight the apparatus is used as follows:

When ahead of the aircraft flying at a given height appears a clearly visible target the reversing lever 13 is brought to its forward position ($v$) and by rotating the handle 10a the pointer 8a is adjusted on the scale 11a in accordance with the height of flight whereby to the line of sight the angle of inclination $\varphi_1$ is imparted. Now the aircraft flies towards the target so that the image of the target continuously approaches the air bubble of the water level. At the moment when the two come in coincidence, the clockwork is started by pressing the button 24 in the usual manner whereupon the image of the target first recedes from the air bubble of the water level, but then again approaches the same. At the moment when the image of the target again coincides with the air bubble of the water level the clockwork is stopped by depressing the button 24 and hence the pointer 8b on the scale 11b indicates a value corresponding to the angle $\varphi_2°$.

Now from Fig. 1 we find that $$\tan\varphi_2 = \frac{BZ_2}{BF} = \frac{vT}{h},$$

T being the period of time in which the target coming from $Z_2$ will reach the point B. Therefore the speed of flight to be determined is $$v = \frac{h\,\tan\varphi_2}{T}$$

The period of time T, however, is the same as that which the clockwork would require for moving the point or journal pin P with any constant speed $c$ by means of the nut 9 from the initial position $P_0$ to the position $P_1$, for according to Fig. 1

$$\tan \varphi_1 = \frac{FP_0}{P_0P_1} = \frac{FP_0}{cT} \text{ and } \tan \varphi_2 = \frac{FP_0}{P_0P_1 + P_1P_2} = \frac{FP_0}{cT+ct}, \frac{\tan \varphi_1}{\tan \varphi_2} = \frac{T+t}{T},$$

$t$ being the time required for moving through the distance $P_1 P_2$ or $Z_1 Z_2$, that is to say the period of time between the two coincidences of the image of the target with the air bubble of the water level.

Making $\frac{h}{T} = 100$ metres per second and hence for instance for $h = 3000$ metres the time $T = 30$ seconds, then from the above equation the speed of flight is $$v = \frac{h}{T} \tan \varphi_2 = 100 \tan \varphi_2.$$

Hence if besides the scale $11a$ for the heights the scale $11^b$ for $\tan \varphi_1$ is provided on the back of $11^a$ the end of the link 8 being constructed as a bifurcated double pointer $8a, 8b$, then, if the period of time T is properly selected, say $$T = \frac{h}{100},$$

and the scale $11b$ is correspondingly proportioned as 100 times the value of $\tan \varphi_1$, the reading on this scale gives directly the value of the speed of flight. For adjusting the inclination $\varphi_1$, it is of course not necessary to cause the clockwork to run until the point P has moved from $P_0$ to $P_1$. It is sufficient to move the point $P_1$ by turning the handle $10a$.

In a similar manner the speed of flight can be determined in the case of flight above the ocean in which case by dropping a floating structure, a visible point of reference is established in rear of the aircraft. It has to be borne in mind that for proper adjusting the apparatus has to be turned around a vertical axis through an angle of 180° and the reversing lever 13 has to be brought to the backward position (R) whereby the movement of the clockwork or the pointers $8a$ and 20 is reversed. When the auxiliary target is located in the rear of the aircraft, the sight line going to the target must first be adjusted to the angle $\varphi_1'$ in order that, as before in the case of an auxiliary target located ahead of the aircraft, at the moment when the image of the target comes into coincidence with the air bubble of the water level, the clockwork may be started by depressing the button 24. Owing to the movement of the entering reflector 3 then beginning, the image of the target will first leave the air bubble of the water level and then again approach this air bubble and at the moment when the target image again coincides with the air bubble the clockwork is stopped by again depressing the button 24. At this latter moment the line of sight to the target is inclined at the angle $\varphi_2'$.

The adjustment for the first angle is effected in this case by the transparent pointer 20 which is provided with a reading mark on the scale disc $12a$ provided with two circular scales. One of these scales, for instance the outer one, has a division for $\tan \varphi_1'$, preferably numbered by the reciprocal $\cot \varphi$ values, which serves for adjusting the pointer 20 to the starting value $BZ_1'$ by turning the handle $10a$.

Now from Fig. 1 it follows:

$$\tan \varphi_1' = \frac{BZ_1'}{BF} = \frac{vT}{h},$$

hence $$v = \frac{h \tan \varphi_1'}{T} = \frac{h}{\cot \varphi_1'} \cdot \frac{1}{T}.$$

By taking preferably $$BZ_1' = \frac{h}{\cot \varphi_1'} = 1000 \text{ metres}$$

and for a height of flight $h$ of for instance 3000 metres, the value of $$\cot \varphi_1' = \frac{h}{1000} = 3.0$$

has to be adjusted on the outer scale, the speed of flight of the aircraft is then $$v = \frac{1000}{T}$$

and can be read by means of the pointer mark on the inner scale $12a$ numbered by thousand times the reciprocal values of the time T.

What we claim is:

1. Apparatus for determining the speed of flight of aircrafts for use with auxiliary targets ahead of, or in the rear of the said aircrafts comprising a sighting telescope; an entering reflector for the said sighting telescope comprising a rotatable pointer, means for rotating the said pointer and for simultaneously rotating the said entering reflector of the telescope, the last named means comprising a clock work, a spindle and a gearing for driving the said spindle by the said clock work, and means for starting, stopping and reversing the direction of movement of the said spindle; and means for turning the apparatus as an entirety around a vertical axis through an angle of at least 180°.

2. Apparatus for determining the speed of flight of aircrafts for use with auxiliary targets ahead of, or in the rear of the said aircrafts, comprising a sighting telescope; an entering reflector for the said sighting telescope comprising a rotatable pointer, means for rotating the said pointer and for simultaneously rotating the said entering reflector of the telescope, the last-named means comprising a clock work, a spindle and a gearing for driving the said spindle by the said clock work, and means for starting, stopping and reversing the direction of movement of the said spindle; a reading scale for the said pointer for use with auxiliary targets ahead of the said aircraft; a reading scale for the said pointer for use with auxiliary targets in rear of the said aircrafts; and means for turning the apparatus as an entirety around a vertical axis through an angle of at least 180°.

3. Apparatus for determining the speed of flight of aircrafts for use with auxiliary targets ahead of or in the rear of the said aircrafts, comprising a sighting telescope; an entering reflector for the said sighting telescope comprising a rotatable pointer, means for rotating the said pointer and for simultaneously rotating the said entering reflector of the telescope, the last-named means comprising a clock work, a spindle and a gearing for driving the said spindle by the said clock work, and means for starting, stopping and reversing the direction of movement of the said spindle; a reading scale for the said pointer for use with auxiliary targets ahead of the said aircrafts; a reading scale for the said pointer for use with auxiliary targets in rear of the said aircrafts, the said reading scales being arranged on one dial; and means for turning the apparatus as an entirety around a vertical axis through an angle of at least 180°.

In testimony whereof we have affixed our signatures.

CHRISTIAN von HOFE.
JOHANN BOYKOW.